(12) United States Patent
Ahn

(10) Patent No.: US 9,062,862 B2
(45) Date of Patent: Jun. 23, 2015

(54) LIGHTING APPARATUS

(71) Applicant: LG ELECTRONICS INC., Seoul (KR)

(72) Inventor: Teajeong Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 386 days.

(21) Appl. No.: 13/693,264

(22) Filed: Dec. 4, 2012

(65) Prior Publication Data

US 2014/0085909 A1    Mar. 27, 2014

(30) Foreign Application Priority Data

Sep. 21, 2012    (KR) ...................... 10-2012-01404930

(51) Int. Cl.
| | | |
|---|---|---|
| *F21V 29/00* | (2006.01) | |
| *F21S 8/08* | (2006.01) | |
| *F21V 21/30* | (2006.01) | |
| *F16M 11/10* | (2006.01) | |
| *F21S 8/00* | (2006.01) | |
| *F21Y 101/02* | (2006.01) | |
| *F21Y 105/00* | (2006.01) | |
| *F21V 29/74* | (2015.01) | |

(52) U.S. Cl.
CPC ................. *F21V 29/00* (2013.01); *F21S 8/033* (2013.01); *F21S 8/086* (2013.01); *F21V 21/30* (2013.01); *F21Y 2101/02* (2013.01); *F21Y 2105/001* (2013.01); *F16M 11/10* (2013.01); *F16M 2200/024* (2013.01); *F21V 29/74* (2015.01)

(58) Field of Classification Search
CPC ....... F21V 29/00; F21V 29/004; F21V 21/30; F16M 11/10; F21S 8/086
USPC ............................................. 362/153.1, 269
See application file for complete search history.

(56) References Cited

U.S. PATENT DOCUMENTS

2013/0215623 A1 *    8/2013    Goodman et al. ............ 362/341

* cited by examiner

*Primary Examiner* — David V Bruce
(74) *Attorney, Agent, or Firm* — KED & Associates, LLP

(57) ABSTRACT

There is disclosed a lighting apparatus, more particularly, a lighting apparatus that is able to control a radiation angle of a body provided therein, with being fitted to a lighting space and in an installation spot or in a state of being installed, and to enhance luminance efficiency and save the energy.

28 Claims, 11 Drawing Sheets

LIGHTING APPARATUS

CROSS REFERENCE TO RELATED APPLICATION

This application claims the benefit of the Patent Korean Application No. 10-2012-0104930, filed on Sep. 21, 2012, which is hereby incorporated by reference as if fully set forth herein.

BACKGROUND OF THE DISCLOSURE

1. Field of the Disclosure

The present invention relates to a lighting apparatus, more particularly, to a lighting apparatus that is able to control a radiation angle of a body provided therein to be fitted to a lighting space.

2. Discussion of the Related Art

Generally, a light source used for lighting in recent may include an incandescent lamp, an electric discharge lamp and a fluorescent lamp and such light sources are used for various purposes such as for domestic usage, landscape usage and industrial usage.

The incandescent lamp which is a resistive light source out of such the light sources has disadvantages of deteriorating light emitting efficiency and heat radiation. The electric discharge lamp has disadvantages of a high price and a high voltage. The fluorescent lamp has an environmental disadvantage of mercury usage.

Meanwhile, a light emitting diode (hereinafter, an LED) is a semiconductor element which emits a light when a voltage is applied thereto forwardly. The light emitting diode has long usage, low power consumption. In addition, it has electrical, optical and physical properties which are proper to mass production. Because of that, the light emitting diodes (LED) have been replacing the incandescent lamps and fluorescent lamps rapidly.

The LED has been applied to a lamp such as a streetlight, a security lamp or a park lamp. The lamp is hung on a pillar member fixed to a wall and it can irradiate a light at an optimized angle toward a lighting space according to environmental conditions.

Such a conventional lamp as a streetlamp is manufactured and produced with a preset tilted angle with respect to a street or an installation surface, before installed in a lighting space. Accordingly, a tilted angle of the lamp with respect to the street or the installation surface is unable to be adjusted or the tilted angle of the installed lamp with respect to the street or the installation surface is unable to be adjusted after installed already.

Specifically, unless a streetlamp is installed properly, the tilted angle of the streetlamp with respect to the street or the installation surface cannot be maintained properly and the light might be irradiated toward the area where lighting is unnecessary or the intensity of illumination at the area where lighting is unnecessary might be deteriorated.

Accordingly, there are demands for the structure of the lighting apparatus to control light distribution for a lighting space properly in an installation spot and even in a state of being installed.

SUMMARY OF THE DISCLOSURE

Accordingly, the present invention is directed to a lighting apparatus. An object of the present invention is to provide a lighting apparatus that is able to freely control an irradiation angle of a body provided therein to be fitted to a lighting space.

Another object of the present invention is to provide a lighting apparatus that is able to efficiently control an irradiation angle of a body provided therein, in an installation spot or after being installed, and to enhance luminance efficiency and save energy.

A further object of the present invention is to provide a lighting apparatus that is able to reduce the number of necessary parts and reduce the production cost.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a lighting apparatus includes a body comprising a substrate, an LED mounted on the substrate, an electronic module to supply an electric power to the LED and a heat sink to radiate the heat generated from the LED; a connection member having a side provided in the body and the other side where a tooth part is provided; a support member to support the connection member and to have the tooth part positioned therein; a first shaft to rotatably connect the support member and the connection member with each other; and a holding member provided in the support member to maintain or release a rotation locking state of the connection member with respect to the support member based on a rotational direction of the tooth part, the holding member comprising a latch part selectively fixed to and separated from the tooth part.

The latch part may allow the tooth part to rotate in one direction of the tooth part and not to rotate in the other opposite direction of the tooth part.

The latch part may maintain a rotation locking state of the tooth part in a first tilted direction in which the weight of the body works, and the latch part may allow the rotation of the tooth part in a second tilted direction which is the reverse direction of the first tilted direction.

In another aspect of the present invention, a lighting apparatus includes a body comprising a substrate, an LED mounted on the substrate, an electronic module to supply an electric power to the LED and a heat sink to radiate the heat generated from the LED; a connection member provided in the body; a support member having the connection member rotatably coupled thereto; and a holding member provided in the support member to maintain a rotation locking state of the connection member to maintain the body tilted at a predetermined angle with respect to the support member.

The rotation locking state of the connection member may be released to adjust the tilted angle of the body, when an external force is applied to the body or the holding member in a first tilted direction in which the weight of the body acts or a second tilted direction which is the reverse direction of the first tilted direction.

As mentioned above, the irradiation angle of the body can be adjusted freely in the lighting apparatus according to the embodiment of the present invention.

Furthermore, according to the lighting apparatus according to the embodiment, the irradiation angle of the body can be adjusted easily in the installation spot or in the installed state. Accordingly, luminance efficiency may be enhanced and the energy may be saved.

Still further, the lighting apparatus according to the embodiment of the present invention may reduce the number of the parts and the production cost and enhance reliability.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

A lighting apparatus according to an exemplary embodiment of the present invention will be described in detail in reference to the accompanying drawings as follows. The accompanying drawings are illustrated to describe examples of the present invention and they are provided to explain the present invention more specifically, as the present invention is not limited thereto.

Reference will now be made in detail to the specific embodiments of the present invention, examples of which are illustrated in the accompanying drawings. Wherever possible, the same reference numbers will be used throughout the drawings to refer to the same or like parts. Repeated description will be omitted and the size and appearance of each part illustrated for explanation convenience may be exaggerated or minimized.

In the meanwhile, terminology including ordinal numbers like 'first' and 'second' may be used to explain various parts of the present invention and the various parts are not limited by the terminology. The terminology is used only to distinguish one of the parts from the others.

Figure 1:
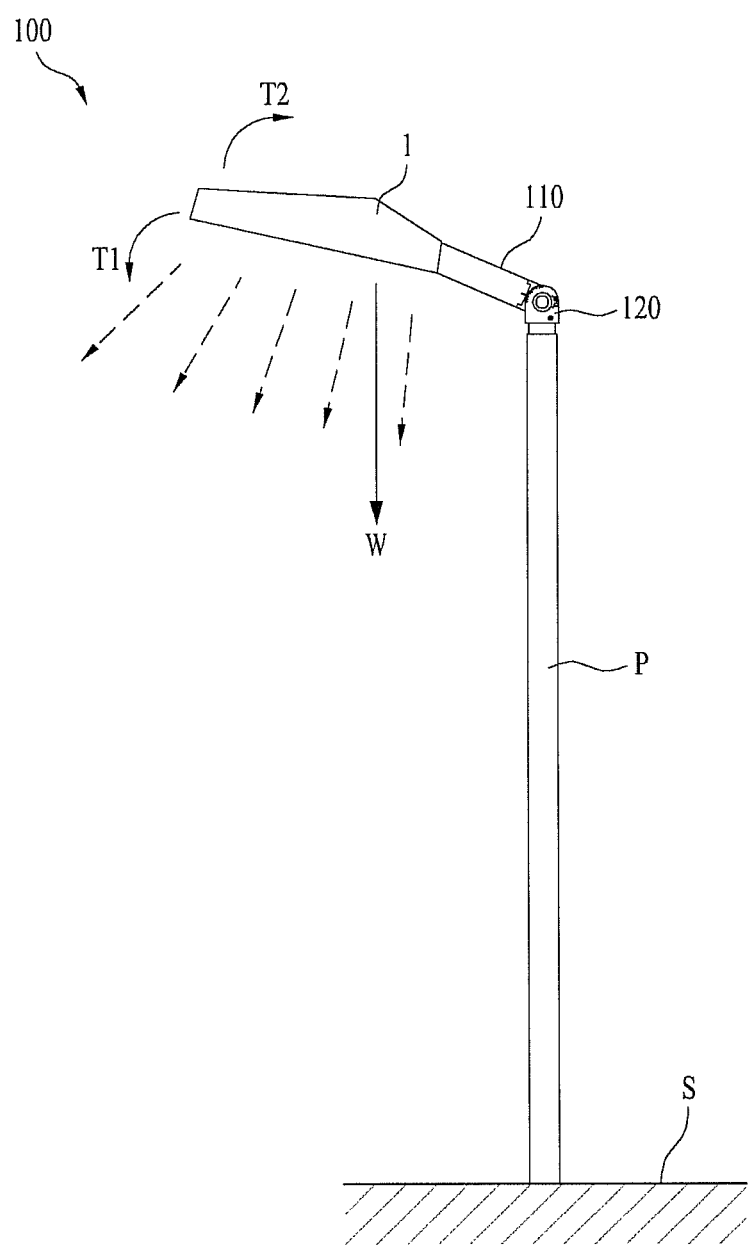
FIG. 1 is a conceptual diagram of a lighting apparatus according to one embodiment of the present invention.

FIG. 1 is a conceptual diagram of a lighting apparatus according to one embodiment of the present invention.

Referring to FIG. 1, a lighting apparatus 100 according to one embodiment of the present invention includes a body 1 to irradiate light to a light distribution region such as a street surface (S), a connection member 110 provided in the body 1 and a support member 120 where the connection member 110 is rotatably coupled.

The lighting apparatus 100 may be one of various type lamps. For explanation sake, the lighting apparatus 100 is a street lamp in the specification. Also, a lamp mentioned in the specification refers to a lighting apparatus having the structure to couple a body to a support member fixed to a wall to irradiate light. The support member 120 can be directly fixed to a street surface (S) or a wall or it may be coupled to an independent pillar member (P). If the support member 120 is coupled to the independent pillar member (P), the pillar member (P) may be installed to the street surface (S) or the wall.

Meanwhile, a tilted angle of the body 1 with respect to the support member 120 can be adjusted in the lighting apparatus 100 according to one embodiment of the present invention. As the tilted angle of the body 1 is adjusted, a problem of light irradiation toward the area where lighting is unnecessary or a problem of deteriorated light luminance in the area may be prevented.

In the lighting apparatus 100 according to one embodiment of the present invention, the tilted angle of the body 1 may be adjusted in a first tilted direction (T1) or a second tilted direction (T2). The first tilted direction (T1) is a direction where the weight of the body 1 acts and the second tilted direction (T2) is the reverse direction of the direction where the weight of the body acts.

The tilted angle of the body 1 may be adjusted in the lighting apparatus 100 according to one embodiment of the present invention, without separating the connection member 110 and the support member 120 that compose the lighting apparatus.

In other words, the lighting apparatus 100 has the structure to adjust the tilted angle of the body 1 even after installed and assembled completely. In such the structure, components composing the lighting apparatus 100 do not have to be separated to adjust the tilted angle of the body 1. Accordingly, there is an effect of reducing the work time or the number of works.

Specifically, when a characteristic of the lighting space, for example, a light distribution region is changed, the lighting apparatus 100 has an advantage of adjusting the tilted angle of the body 1 in a state of being installed, even with no process of dissembling or assembling the components after the lighting apparatus 100 is demounted.

Referring to the drawings herewith, a lighting apparatus 100 according to a first embodiment of the present invention will be described as follows.

Figure 2:
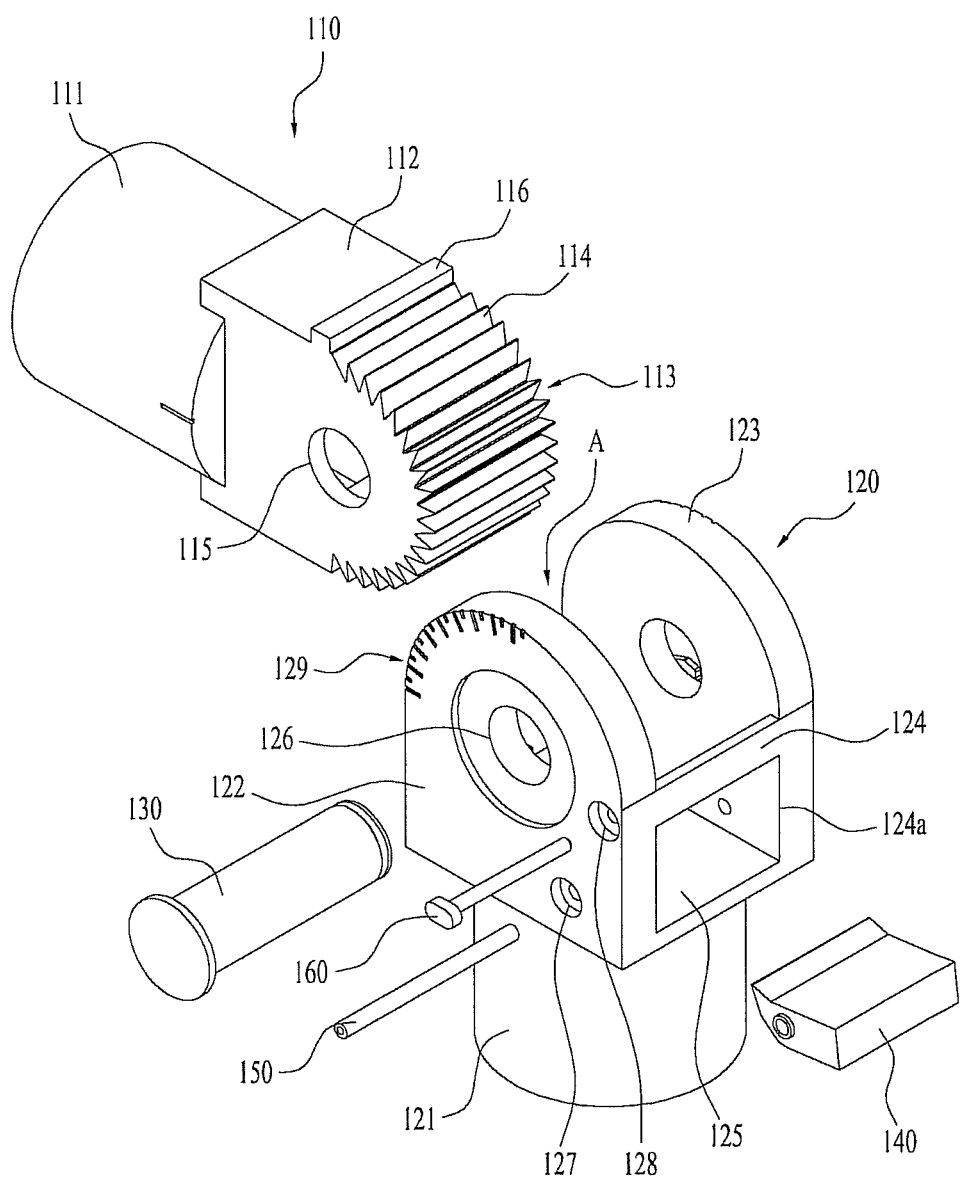
FIG. 2 is a cut-away perspective view of a lighting apparatus according to a first embodiment of the present invention.
Figure 3:
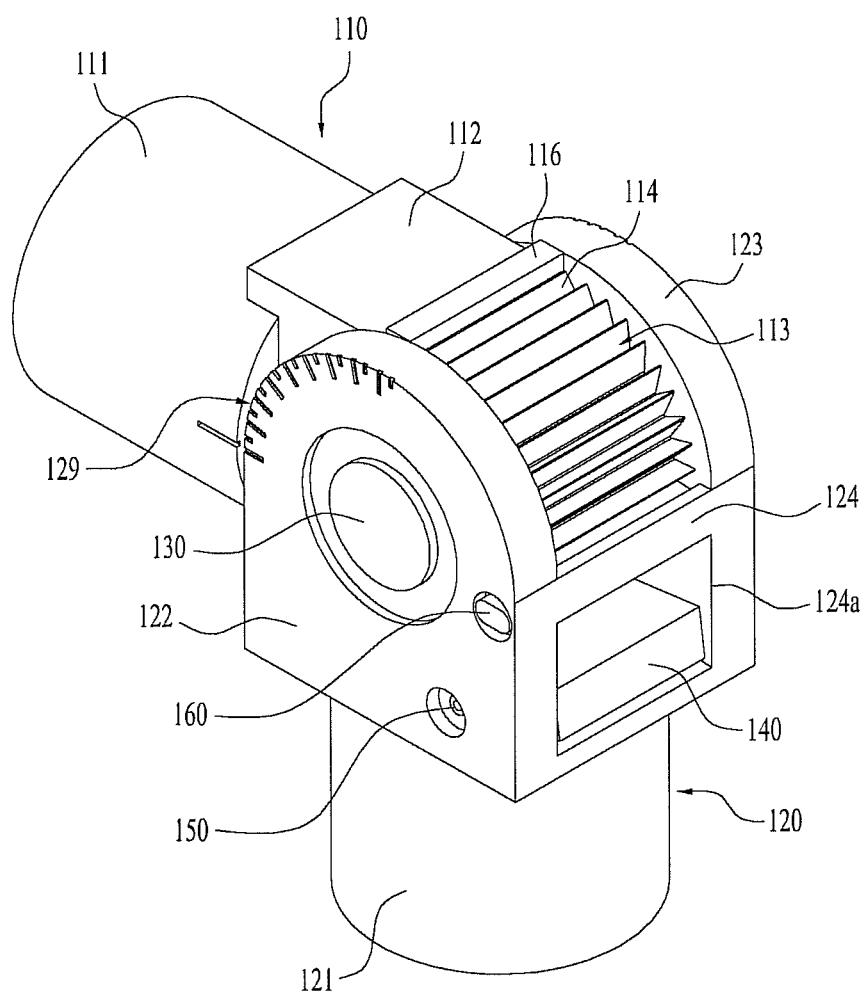
FIG. 3 is a perspective view of components shown in FIG. 2 that are assembled to each other.
Figure 4:
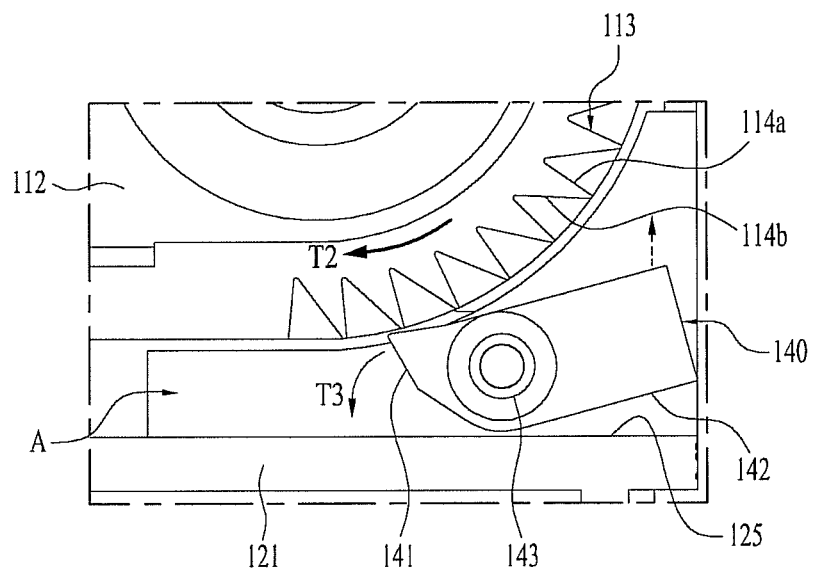
FIGS. 4 and 5 are conceptual diagrams to explain a tilted angle adjustment state of the lighting apparatus according to the first embodiment of the present invention.
Figure 5:
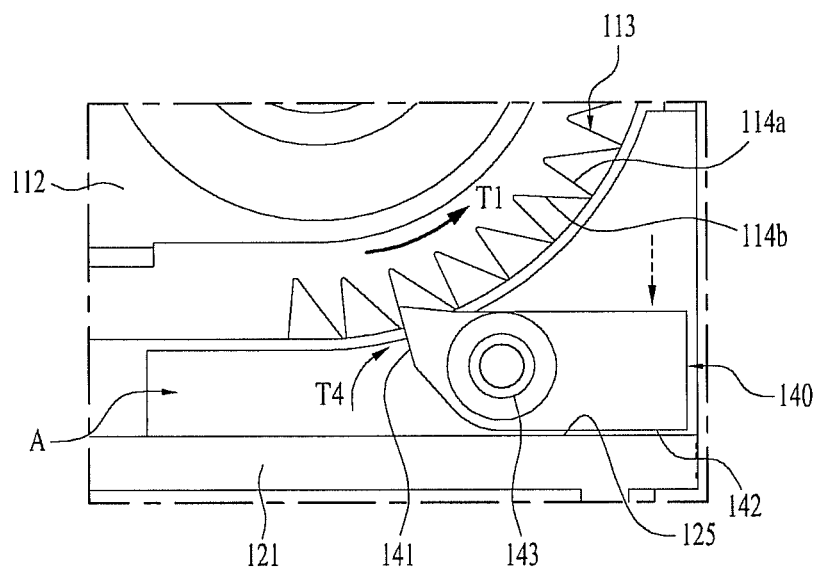

FIG. 2 is a cut-away perspective view of a lighting apparatus according to a first embodiment of the present invention. FIG. 3 is a perspective view of components shown in FIG. 2 that are assembled to each other. FIGS. 4 and 5 are conceptual diagrams to explain a tilted angle adjustment state of the lighting apparatus according to the first embodiment of the present invention.

Referring to FIGS. 2 to 5, the lighting apparatus 100 according to the first embodiment of the present invention includes a body 1 having a substrate, an LED mounted on the substrate, an electrical part unit to supply the electricity to the LED and a heat sink to radiate the heat generated from the LED, a connection member 110 having a side 111 provided in the body 1 and the other side 112 where a tooth part 113 is provided, a support member 120 to support the connection member 110, having the tooth part 113 arranged therein, a first shaft 130 to rotatably connect the support member 120 and the connection member 110 with each other, a latch part 141 provided in the support member 120 to allow the tooth part 113 to rotate in one direction, and a holding member 140 to keep or unlock a rotation lock of the connection member 110 with respect to the support member 120 based on a rotational direction of the tooth part 113.

In this instance, the latch part 141 allows the tooth part to rotate in one direction and not to rotate in an opposite direction.

The latch part 141 maintains the locked state of the rotation of the tooth part 113 along the first tilted direction (T1) in which the weight of the body 1 acts and it allows the rotation of the tooth part 113 along the second tilted direction (T2) that is the reverse direction of the first tilted direction (T1).

For that, saw-teeth 114 of the tooth part 113 have the shape capable of pushing the latch part 141 of the holding member 140 in a direction for separating the latch part 141 from the tooth part 113, when the body 1 is rotated in the second tilted direction (T2), not the symmetrical shape (for example, a shape of an isosceles triangle). For example, left sides 114a may be formed longer than right sides 114a of the saw-teeth 113 based on the saw-teeth 113 shown in FIG. 4.

Also, the lighting apparatus 100 according to the first embodiment of the present invention includes the body 1 having the substrate, the LED mounted on the substrate, the electronic module to supply the electricity to the LED and the heat sink to radiate the heat generated from the LED, the connection 110 provided in the body 1, the support member 120 where the connection member 110 is rotatably coupled, and the holding member 140 rotatably coupled to the support member 120 to maintain a rotation locking state of the connection member 110 to make the body 1 maintained at a predetermined tilted angle.

When an external force is applied to the body 1 or the holding member 140 along the first tilted direction (T1) where the weight of the body 1 acts or the second tilted direction (T2) which is the reverse direction of the first tilted direction (T1), the rotation locking state of the connection member 110 is unlocked to allow the tilted angle of the body 1 adjusted.

Also, when the external force is removed from the body 1 or the holding member 140 at a predetermined tilted angle, the holding member 140 may maintain the connection member 110 in the rotation locking state to make the body 1 maintain the corresponding tilted angle.

In the present specification, the applying of the external force to the body 1 or the holding member 140 may means that the first tilted direction or second tilted direction operation of the body 1 or the holding member 140 is performed to adjust the tilted angle of the body 1. Specifically, it means that a user applies the external force used in rotating the body 1 or the holding member 140 in one of the tilted directions to adjust the tilted angle of the body 1.

Referring to FIG. 1, the force generated by the weight (W) of the body 1 always acts in the lighting apparatus 100. After the user installs the lighting apparatus 100 at a predetermined tilted angle, the tilted angle is prevented from being freely adjusted by the weight of the body 1 or the like.

As one of examples, when the external force is applied to the body 1 in the second tilted direction, the rotation locking state of the connection member 110 may be released along the second tilted direction (T2). The connection member 110 may be rotatably coupled to the support member 120 and the rotation locking state of the connection member 110 with respect to the support member 110 may be maintained by the holding member 140. Also, the maintaining of the support member 120 in the rotation locking state may mean that the tilted angle of the body 1 is in an adjustable state, in other words, that the connection member 110 is converted to be rotatable with respect to the support member. At this time, the rotation locking state of the connection member 110 is released in the body 1 along the second tilted direction (T2) and the user rotates the body 1 in the second tilted direction, only to adjust the tilted angle of the body 1.

In contrast, the releasing of the rotation locking state of the connection member 110 may mean that the tilted angle of the body 1 is in an adjustable state, in other words, that the connection member 110 is converted to be rotatable with respect to the support member 120. At this time, the rotation locking state of the connection member 110 is released in the body 1 in the second tilted direction (T2) and the user rotates the body 1 in the second tilted direction, only to adjust the tilted angle of the body 1.

After that, the tilted angle of the body 1 with respect to the support member 120 is adjusted to be a specific angle. Unless the user applies an external force to the body 1, the holding member 140 may maintain the connection member 100 in the rotation locking state and the body may maintain the predetermined tilted angle.

Optionally, when an external force is applied to the body 1 along the first tilted direction (T1), the rotation locking state of the connection member 110 may be maintained at the predetermined tilted angle. In other words, even when the user tries to rotate the body 1 in the first tilted direction, the rotation locking state of the connection member 110 is maintained in the first tilted direction (T1). Accordingly, even when the user applies an external force to the body 1 in the first tilted direction (T1), the tilted angle of the body 1 may not be adjusted in the first tilted direction (T1).

As mentioned above, the weight (W) acts in the body 1 and the substrate, the LED, the electronic module and the heat sink are provided in the body 1 such that the weight of the body 1 may be quite a lot. When the user applies an external force to the body 1 in the first tilted direction (T1) in the state of the lighting apparatus 100 being installed, the force generated by the external force and the weight of the body are added up and the tilted angle of the body is changed drastically. In addition, the body 1 might be separated from the support member 120 or damaged.

Meanwhile, when an external force is applied to the holding member 140, the rotation locking state of the connection member 110 may be released in the first tilted direction (T1) and the second tilted direction (T2). In this instance, the applying of the external force to the holding member 140 may means that the user applies the external force to separate the holding member 140 from the connection member 110, specifically, that the latch part 141 of the holding member 140 is rotated in the first tilted direction (T1). The rotating the latch part 141 of the holding member 140 in the first tilted direction (T1) may mean that the latch part 141 of the holding member 140 is separated from the connection member 110.

Referring to the drawings herewith, the structure of the connection member 110 and the support member 120 which can realize such the operation mentioned above will be described as follows. The structure of the body 1 will be described later.

Referring to FIGS. 2 and 3, the connection member 110 may include a first member 111 coupled to the body 1 and a second member 112 rotatably coupled to the support member 120. The first member 111 has a hallow cylindrical shape and a cable (not shown) may pass a hallow portion of the first member 111 to connect the electronic module (50, see FIG. 6) of the body 1 and an external power supply (not shown) with each other.

A through-hole 115 may be provided in the second member 112 to insert the first shaft therein and the first shaft 130 rotatably connects the connection member 110 to the support member 120. The tooth part 113 is selectively fixed to the second member 112 by the holding member 140.

The tooth part 113 consists of the plurality of the saw-teeth 114. A unit adjustment angle may be determined based on a distance between neighboring teeth, namely, a pitch (for example, a circular pitch) to adjust the tilted angle of the body 1.

In addition, a stopper 116 contacting with the support member 120 at the maximum tilted angle with respect to the support member 120 may be provided in the second member 112. The maximum tilted angle may be the maximum angle in the second tilted direction or 180°. At this time, the connection member 110 and the support member 120 may be substantially arranged in a straight line.

The support member 120 may include a third member 121 directly coupled, to the street surface (S) or an independent third pillar member (P), a first side wall 122 and a second side wall 123 spaced apart a predetermined distance from the first side wall 122.

A predetermined space may be formed in the distance spaced apart between the first and second side walls 122 and 123. The first side wall 122 and the second side wall 123 may be extended from the third member 121.

An angle display part 129 may be provided in the support member 120 to display the tilted angle of the connection member 110 with respect to the support member 120. As one of examples, the angle display part 129 may be provided in one side wall 122 of the support member 120.

Referring to FIGS. 2 and 3, the second member 112 of the connection member 110 may be arranged in the space (A) formed between the first and second side walls 122 and 123 and the third member 121. The second member 112 may be rotatably coupled to the support member 120 via the first shaft 130.

The first shaft 130 may pass through one of the side walls 12 or 123 provided in the support member 120 and the connection member 110. The through-hole 115 may be provided in the connection member 110 to insert the first shaft 130 therein. For that, a first through-hole 126 may be formed in one side wall 122 to insert the first shaft 130 therein.

The holding member 140 may be rotatably arranged in the space (A) between the first and second side walls 122 and 123. The holding member 140 may be rotatably coupled to the support member 120 via the second shaft 150. As one of examples, the second shaft may pass through one of the side walls 122 or 123 provided in the support member 120 and the holding member 140. A through hole 143 may be formed in the holding member 140 to insert the second shaft 150 therein and a second through hole 127 may be formed in one side wall 122 to insert the second shaft 150 therein.

The latch part 141 may be provided in the holding member 140 to be selectively fixed to the tooth part 113 of the connection member 110. The second member 112 and the holding member 140 may be arranged adjacent to each other to make the tooth part 113 and the latch part 141 selectively secured or separated there from.

Meanwhile, the lighting apparatus 100 may further include a first fixing pin 160 fixed to the tooth part 113 of the connection member 110 via the support member 120. The first fixing pin 160 is employed to maintain the rotation locking state with respect to the support member 120.

In other words, as mentioned above, the rotation locking state of the connection member 110 may be maintained by the holding member 140. However, to enhance installation stability and reliability of the body 1, the first fixing pin 160 may additionally be employed to maintain the rotation locking state of the connection member 110. Under such the structure, the first fixing pin 160 has to be removed firstly to adjust the tilted angle of the body 1.

A third through hole 128 may be formed in one side wall 122 to insert the first fixing pin 160 therein.

Optionally, the first fixing pin 160 may be inserted in the space between neighboring saw-teeth 114 of the tooth part 113 or in a predetermined portion of the second member 112 of the connection member 110, to maintain the rotation locking state of the connection member 110.

The number of the first fixing pins 160 and third through holes 128 and the inserting position of the first fixing pin 160 may be determined variously, considering the weight and exterior design of the body 1.

Meanwhile, a third side wall 124 may be provided in the support member 120 to connect the first side wall 122 and the second side wall 123 with each other. The holding member 140 may be partially exposed outside via the third side wall 124 to provide easy accessibility to the user. As one of examples, an opening 124a may be provided in the first side wall 124 to partially expose the holding member 140.

Meanwhile, the stopper 116 may be provided in the connection member 110 and it may contact with the support member 120 at the maximum tilted angle of the connection member 110 with respect to the support member 120. as one of examples, the stopper 116 may contact with the third side wall 124 at the maximum tilted angle of the connection member 110. The maximum tilted angle may be 180°.

Referring to FIGS. 4 and 5, the process of adjusting the tilted angle of the body 1 in the lighting apparatus 100 having the structure mentioned above will be described in detail.

As mentioned above, the tooth part 113 may be provided in the connection member 110 and the latch part 141 fixed to the tooth part 113 may be provided in the holding member 140 in the rotation locking state of the connection member 110.

Referring to FIGS. 1 and 4, when the user releases the contact between the holding member 140 and the connection member 110 after applying an external force to the holding member 140, the rotation locking state of the connection member 110 may be unlocked to make the body 1 rotate in the first tilted direction (T1) or the second tilted direction (T2).

Referring to FIG. 4, as one embodiment, the holding member 140 has the structure to rotate in the first tilted direction (T3) and a second tilted direction (T4) with respect to the latch part 141. At this time, when it is rotated in the first tilted direction (T3) with respect to the latch part 141, the holding member 140 may be separated from the tooth part 113 of the connection member 110 and the rotation locking state of the connection member 110 may be released. Accordingly, the user may rotate the body 1 in the first tilted direction (T1) or the second tilted direction (T2) and adjust the tilted angle of the body 1.

Optionally, referring to FIG. 5, when the holding member 140 is rotated in the second tilted direction (T4) with respect to the latch part 141, the latch part 141 of the holding member 140 is rotated toward the tooth part 113 of the connection member 110 and positioned between two neighboring ones of the saw-teeth 113. At this time, the rotation locking state of the connection member 110 may be maintained only if the user applies an additional external force to the body 1.

For such the structure, the holding member 140 is rotated in the second tilted direction (T4). When the latch part 141 is positioned between neighboring ones of the saw-teeth 113 after that, the rotation of the holding member 140 along the second tilted direction has to be restrained.

As one embodiment, a predetermined portion of the holding member 140 contacts with the support member 120 and the rotation locking state of the holding member 140 in the second tilted direction (T4) may be maintained.

When the holding member 140 is rotated in the second tilted direction (T4), a bottom 142 of the holding member 140 may contact with the support member 120 and the rotation locking state of the holding member 140 may be maintained accordingly. Specifically, when the holding member 140 is rotated in the second tilted direction (T4), the bottom 142 of the holding member 140 may contact with the third member 121 of the support member 120. More specifically, when the holding member 140 is rotated in the second tilted direction (T4), the bottom 142 of the holding member 140 may contact with a bottom 125 of the space (A) (a top surface of the third member).

The user rotates the holding member 140 in the first tilted direction (T3) in the state of the lighting apparatus being installed. After that, the user may release the rotation locking state of the connection member 110 and the tilted angle of the body 1 may be adjusted in the first tilted direction (T1) or the second tilted direction (T2).

Until now, the rotation locking state of the connection member 110 is described based on the embodiment in that the external force is applied to the holding member 140. However, the rotation locking state of the connection member 110 will be described based on an embodiment in that an external force is applied to the body 1 as follows.

As mentioned above, the holding member 140 may be coupled to the support member 120 to be allowed to rotate in the first tilted direction (T3) with respect to the latch part 141 freely and to be restrained to rotate in the second tilted direction (T4).

Referring to FIG. 4, when the external force is applied to the body 1 in the second tilted direction (T4) as mentioned above, the rotation locking state of the holding member 140 and the rotation locking state of the connection member may be released.

In other words, when the body 1 has the external force applied in the second tilted direction (T2), the holding member 140 may be provided with a rotational force in the first tilted direction (T3). At this time, the holding member 140 is allowed to rotate with respect to the latch part 141 in the first tilted direction (T3) freely. Accordingly, even without applying the external force to the holding member 140, the user may apply the external force to the body 1 along the second tilted direction (T2) and adjust the tilted angle of the body 1.

Optionally, referring to FIG. 5, when an external force is applied to the body 1 in the first tilted direction (T1), the rotation locking state of the holding member 140 may be maintained by the support member 120. Also, the predetermined portion of the holding member 140 is in contact with the support member 120 and the rotation locking state of the holding member 140 may be maintained accordingly.

Briefly, the user may apply the external force to the holding member 140 to release the rotation locking state of the connection member 110 with respect to the support member 120 and to adjust the tilted angle of the body 1 in the first tilted direction (T1). The user may apply the external force to the body 1 or the holding member 140 to adjust the tilted angle of the body 1 in the second tilted direction (T2).

Referring to the drawings herewith, a body 1 composing a lighting apparatus 100 according to one embodiment of the present invention will be described in detail as follows. The structure of the body 1 is identical to that of the body 1 provided in the lighting apparatus 100 according to the first and second embodiments of the present invention.

Figure 6:
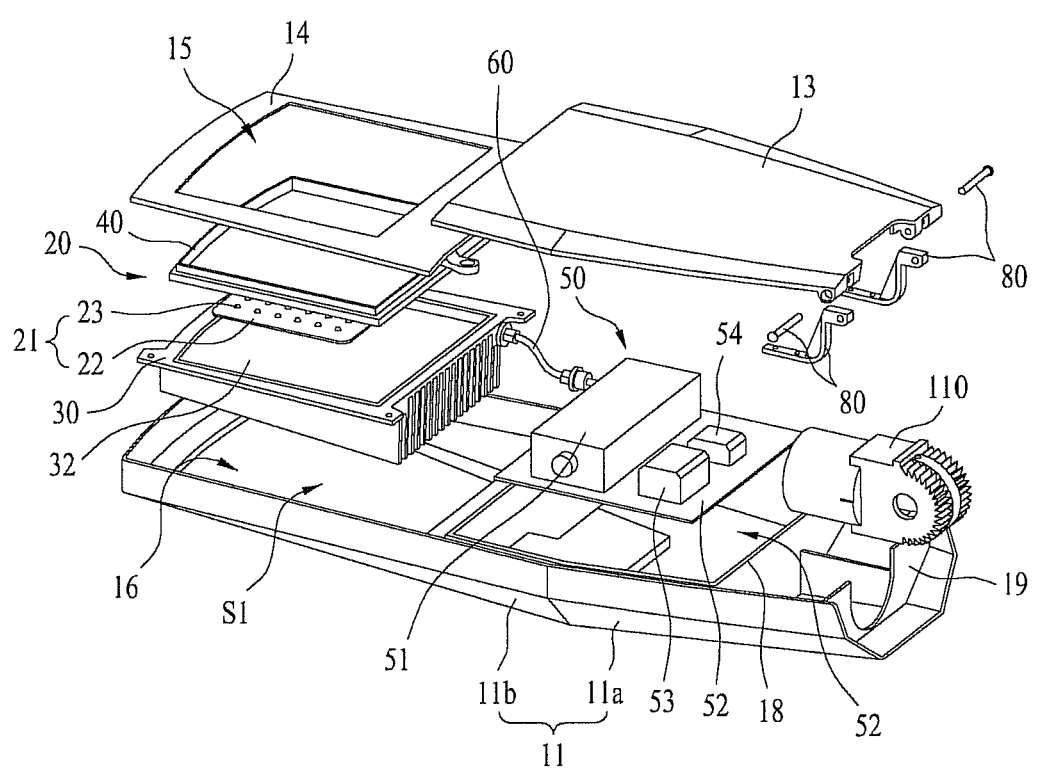
FIG. 6 is a cut-away perspective view of a body composing the lighting apparatus according to one embodiment of the present invention.

FIG. 6 is a cut-away perspective view of the body 1 composing the lighting apparatus 100 according to one embodiment of the present invention.

Referring to FIG. 6, the body 1 may include an LED module 21, a heat sink 30 arranged on a back side of the LED module 21, a light transmitting member 40 arranged on a top side of the LED module 21, a housing 50 having a first opening 15 where the light transmitting member 40 is positioned and a second opening 16 where the heat sink 30 is positioned, and an electronic module 50 arranged in the housing 10 to supply electricity to the LED module 21. The LED module 21 may include a substrate 22 and at least one LED 23 mounted on the substrate.

Meanwhile, the LED module 21, the heat sink 30 and the light transmitting member 40 may be referenced to as 'a light emitting module 20'.

In addition, the heat sink 30 is to radiate the heat generated from the LED module 21 outside and it may be formed of a metallic material with high heat conductivity and good durability. A recess 32 may be provided in the heat sink 30 and the LED module 21 may be arranged in the recess 32. The light transparent member 40 covers the LED module 21 and the recess 32.

The light transmitting member 40 may be formed of a light transmitting resin material to emit the light irradiated from the LED module 21 toward the lighting space. The light emitting member 40 may include a diffusive member to diffuse the lights irradiated from the LED module 21 and it may include a plurality of lenses to guide and emit the lights irradiated from the LED module 21 to a specific region.

The electronic module 50 may include a converter 51 to convert an external power supply, a surge protector 53 to protect the electronic module 50 from a thunderbolt, a terminal block 54 to connect the converter 51 and the external power supply (not shown) with each other, and a coupling member 52 to couple the surge protector 53 and the terminal block 54.

In addition, a connector 60 may be provided in the body 1 to electrically connect the LED module 21 of the light emitting unit 20 and the electric unit 50 (especially, the converter) with each other.

Meanwhile, the electronic module 50 may be arranged not to be overlapped with the first opening 15 and the second opening 16. Such the structure can prevent the water drawn into the first opening 15 from reaching the electronic module 50 directly.

The housing 10 has the first opening 15 where the light transmitting member 40 is positioned and the second opening 16 where the heat sink is positioned.

The first opening 15 is employed to transmit the light emitted from the light transmitting member 40 there through and the second opening 16 is employed to radiate the heat sink 30 by allowing inlet and outlet of external air.

Meanwhile, the housing 10 may include a first space part (S1) where the LED module 21 is arranged and a second space part (S2) where the electronic module 50 is arranged. As one embodiment, the first space part (S1) and the second space part (S2) may be partitioned off along a longitudinal direction of the housing 10.

At this time, a partition wall 18 surrounding the electronic module 50 may be provided in the second space part (S2) of the housing 10 to protect the electronic module 50 from the water drawn into the housing 10.

In addition, a coupling part 19 may be provided in the second space part (S2) to couple the connection member 110 thereto.

The light emitting unit 20 may be arranged in the housing 10 and it may has the first body having the partition wall 18 provided therein and the second body 13 arranged in a position facing the partition wall 18, with covering the electronic module 50. At this time, the second body 13 may be rotatably coupled to the first body 11 via a hinge mechanism 80.

Accordingly, the body 1 may rotate the second body 13 with respect to the first body 11, only to expose the electronic module 50 and it may bring an effect of an easy service for repairing and exchanging parts of the electronic module 50.

In addition, the housing may have a first body 14 having a first opening 15. The third body 14 may be fixed to the first body 11. Once the third body 14 is separated from the first body 11, it will be easier to repair and exchange the parts of the light emitting unit 20.

Moreover, the first body 11 may be divided into a first region 11a for forming the first space part (S1) and a second region 11b for forming the second space part (S2). A second opening 16 may be provided in the first region 11b.

When the lighting apparatus 100 coupled to the support member 120 is installed, the first body 11 happens to directly contact with rain and it may be formed in a streamlined shape, to guide such rain to an installation surface (W). As one embodiment, the first body 11 has the first region 11a and the second region 11b which are inclined in different directions. The first region 11a forms the first space part (S1) and the second region 11b forms the second space part (S2).

Such an inclined structure or a streamline shape enables the rain falling to the first body 11 toward the street surface (S) quickly.

Figure 7:
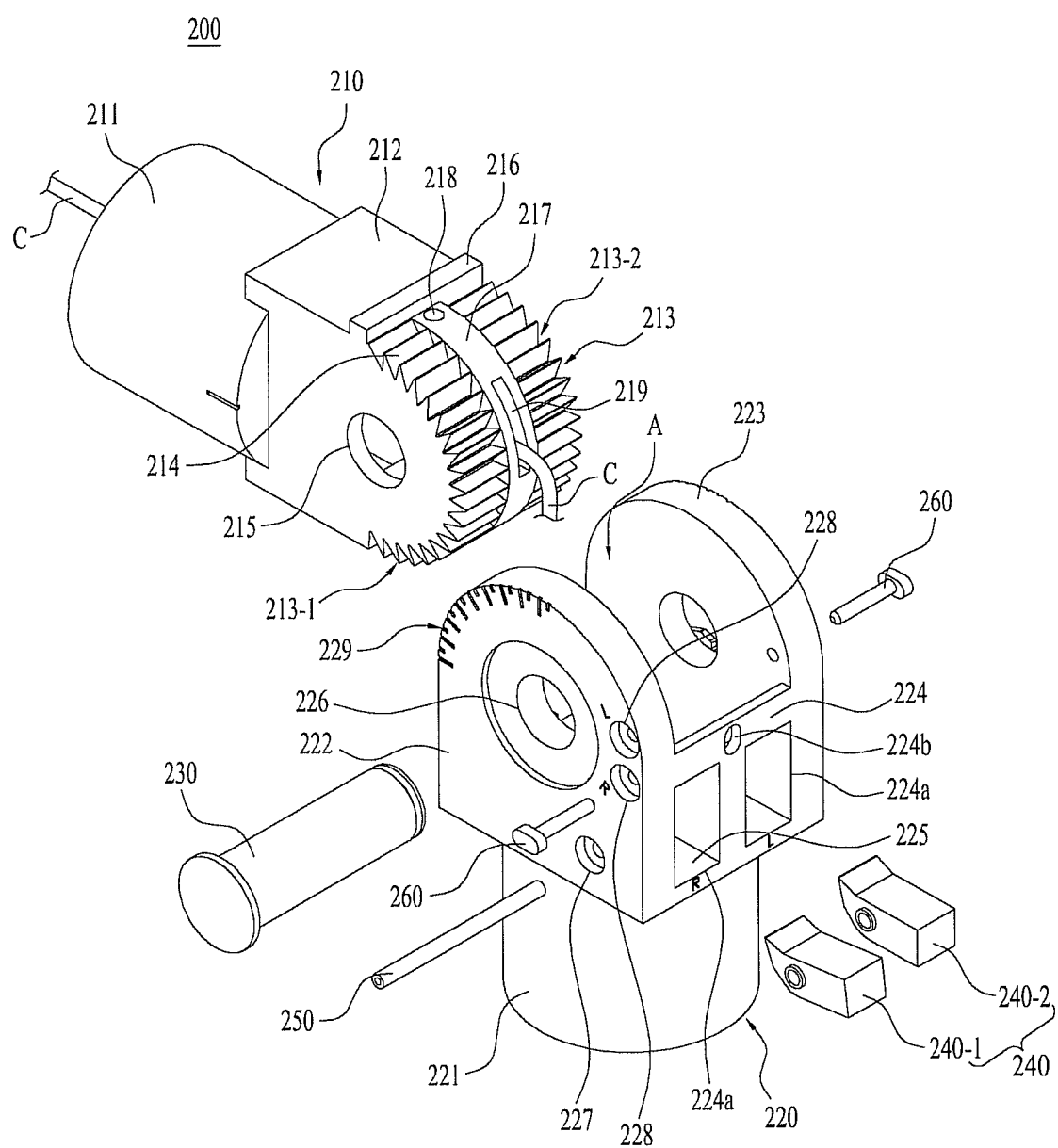
FIG. 7 is a cut-away perspective view of a lighting apparatus according to a second embodiment of the present invention.
Figure 8:
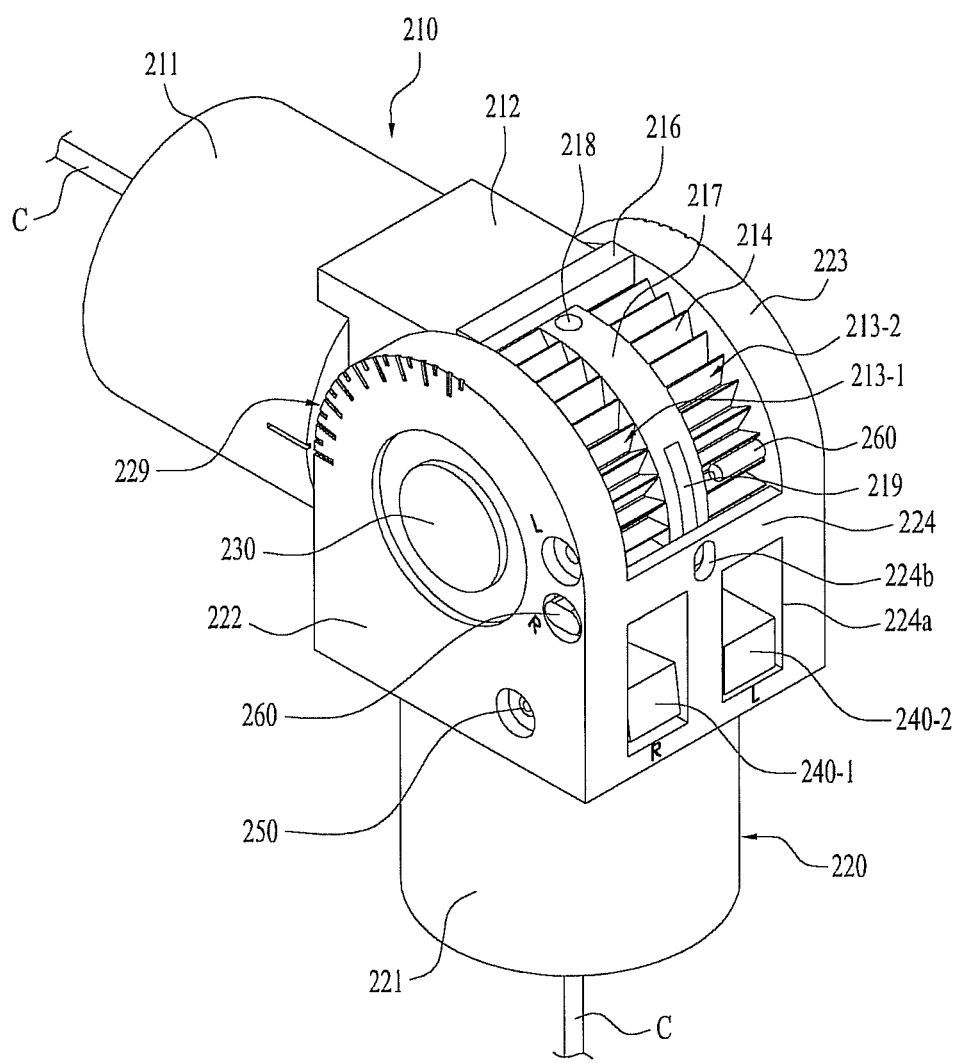
FIG. 8 is a perspective view of components shown in FIG. 7 that are assembled to each other.
Figure 9:
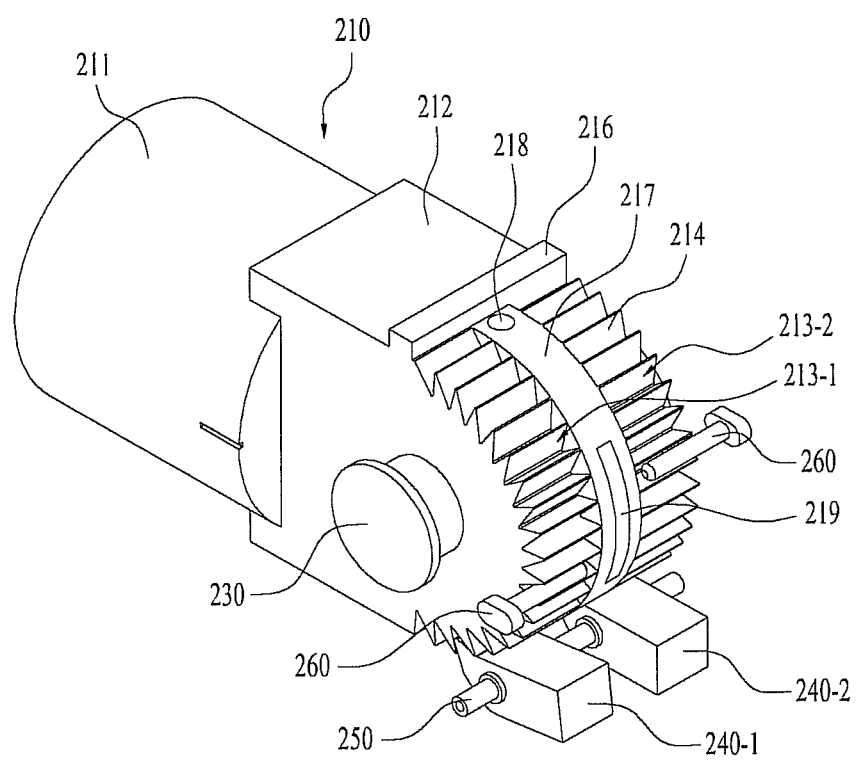
FIG. 9 is a perspective view of some components shown in FIG. 7 that are assembled to each other.

Referring to the drawings herewith, a lighting apparatus 200 according to a second embodiment of the present invention will be described in detail as follows. FIG. 7 is a cut-away perspective view of a lighting apparatus according to a second embodiment of the present invention. FIG. 8 is a perspective view of components shown in FIG. 7 that are assembled to each other. FIG. 9 is a perspective view of some components shown in FIG. 7 that are assembled to each other;

Referring to FIGS. 7 and 8, the lighting apparatus 200 according to the second embodiment may include a body (1, see FIG. 1), a connection member 210 provided in the body 1, a support member 220 where the connection member 210 is rotatably coupled, and a holding member 240 rotatably coupled to the support member 220 to maintain the connection member 210 in a rotation locking state to maintain the body 1 tilted at a predetermined angle.

As mentioned above, the body 1 composing the lighting apparatus 100 according to the first embodiment has the same structure as the lighting apparatus 200 according to the second embodiment does.

However, the connection member 210, the support member 220 and the holding member 240 which compose the lighting apparatus 200 according to the second embodiment are different from the connection member 110, the support member 120 and the holding member 140 which compose the lighting apparatus 100 according to the first embodiment. Such differences will be explained in detail as follows.

Referring to FIGS. 7 and 8, the connection member 210 may include a first member 211 coupled to the body 1 and a second member 212 rotatably coupled to the support member 220. The first member 211 has a hollow cylindrical shape and a cable (not shown) may pass through a hollow portion of the first member to connect an electric unit (50, see FIG. 6) and an external power supply (not shown) with each other.

The second member 212 may have a through hole 215 formed to insert a first shaft 230 therein and the first shaft 230 is to rotatably couple the connection member 210 to the support member 220. A tooth part 213 may be selectively secured to the second member 212 by the holding member 240.

The tooth part 213 consists of the plurality of the saw-teeth 214. A unit adjustment angle may be determined based on a distance between neighboring teeth, namely, a pitch (for example, a circular pitch) to adjust the tilted angle of the body 1.

In addition, a stopper 216 contacting with the support member 220 at the maximum tilted angle with respect to the support member 220 may be provided in the second member 212. The maximum tilted angle may be the maximum angle in the second tilted direction or 180°. At this time, the connection member 210 and the support member 220 may be substantially arranged in a straight line.

Meanwhile, the tooth part 213 may include a first tooth part 213-1 and a second tooth part 213-2 twisted a predetermined angle with respect to the first tooth part 123-1. The holding member 240 may include a first holding member 240-1 selectively secured to the first tooth part 213-1 and a second holding member 240-2 selectively secured to the second tooth part 213-2.

In other words, a plurality of tooth parts and a plurality of holding members are provided in the lighting apparatus 200 according to the second embodiment. For explanation sake, two tooth parts 213 and two holding members 240 are provided.

As mentioned above, the first tooth part 213-1 consists of a plurality of saw-teeth 214 and a unit adjustment angle may be determined based on a distance between neighboring teeth, namely, a pitch (for example, a circular pitch) to adjust the tilted angle of the body 1. The second tooth part 213-2 also consists of a plurality of saw-teeth 214 and a unit adjustment angle may be determined based on a distance between neighboring teeth, namely, a pitch (for example, a circular pitch) to adjust the tilted angle of the body 1.

The first tooth part 213-1 and the second tooth part 213-2 may have the same circular pitch. Unit adjustment angles formed by the first tooth part 213-1 and the second tooth part 213-2 to adjust the tilted angle of the body 1 may be the same. For example, each of the unit adjustment angles may be 10°.

In this instance, the unit adjustment angles for adjusting the tilted angle of the body 1 may be determined based on the twisted angles of the first tooth part 213-1 and the tooth part 213-2 or they may be determined based on a smaller circular pitch than the circular pitches of the first and second tooth parts 213-1 and 213-2.

As one embodiment, when the first and second tooth parts 213-1 and 213-2 have unit adjustment angles of 10° and the twisted angles of the first and second tooth parts 213-1 and 213-2 are twisted angles of 5°, the unit adjustment angle for adjusting the tilted angle of the body 1 may be 5°. Accordingly, the plurality of the tooth parts 213-1 and 213-2 are provided in the connection member 211, the unit adjustment angle of the body 1 may be determined more precisely.

Moreover, a connected part 217 may be provided between the first tooth part 213-1 and the second tooth part 213-2 in the connection member 210. The first tooth part 213-1 and the second tooth part 213-2 may be twisted a predetermined angle in both sides with respect to the connected part 217, respectively.

A slot 219 may be provided in the connected part 217 and the cable (C) connected to the electronic module 50 is exposed outside via the first member 211, the slot 219 of the connected part 217 and the support member 220.

Meanwhile, the support member 220 may include a third member 221 directly coupled to the street surface (S) or an independent third pillar member (P), a first side wall 222 and a second side wall 223 spaced apart a predetermined distance from the first side wall 222.

A predetermined space may be formed in the distance spaced apart between the first and second side walls 222 and 223. The first side wall 222 and the second side wall 223 may be extended from the third member 221.

An angle display part 229 may be provided in the support member 220 to display the tilted angle of the connection member 210 with respect to the support member 220. As one of examples, the angle display part 229 may be provided in one side wall 222 of the support member 220.

Referring to FIGS. 7 and 8, the second member 212 of the connection member 210 may be arranged in the space (A) formed between the first and second side walls 222 and 223 and the third member 221. The second member 212 may be rotatably coupled to the support member 220 via the first shaft 230.

The first shaft 230 may pass through one of the side walls 222 or 223 provided in the support member 220 and the connection member 210. The through-hole 215 may be provided in the connection member 210 to insert the first shaft 230 therein. For that, a first through-hole 226 may be formed in one side wall 222 to insert the first shaft 230 therein.

The first and second holding member 240-1 and 240-2 may be rotatably arranged in the space (A) between the first and second side walls 222 and 223. The first and second holding member 240-1 and 240-2 may be rotatably coupled to the support member 220 via the second shaft 250. As one of examples, the second shaft 250 may pass through one of the side walls 222 or 223 provided in the support member 220 and the holding members 240-1 and 240-2. A through hole 243 may be formed in the holding member 240 to insert the second shaft 250 therein and a second through hole 227 may be formed in one side wall 222 to insert the second shaft 250 therein.

The latch part 241 may be provided in the first and second holding member 240-1 and 240-2 to be selectively fixed to the first and second tooth part 213-1 and 213-2 of the connection member 210. the second member 212 and the first and second holding members 240-1 and 240-2 may be arranged adjacent to each other to make the corresponding tooth parts 213-1 and 213-2 and the latch parts 241 of the corresponding holding members 240-1 and 24-2 selectively secured or separated there from.

Meanwhile, the lighting apparatus 100 may further include a plurality of first fixing pins 260 fixed to the first or second tooth part 213-1 or 213-2 of the connection member 210 via the support member 220. The plurality of the first fixing pins 260 may be employed to maintain the rotation locking state of the connection member 210 with respect to the support member 220.

In other words, as mentioned above, the rotation locking state of the connection member 210 may be maintained by the first or second holding member 240. However, to enhance installation stability and reliability of the body 1, the first fixing pins 260 may be employed to maintain the rotation locking state of the connection member 210. Under such the structure, the first fixing pins 260 have to be removed preferentially to adjust the tilted angle of the body 1.

A plurality of third through holes 228 may be formed in one side wall 222 to insert the first fixing pins 160 therein.

Optionally, the first fixing pin 260 may be inserted in the space between neighboring saw-teeth 214 of the first or second tooth part 213-1 or 213-2, or in a predetermined portion of the second member 212 of the connection member 210, to maintain the rotation locking state of the connection member 210.

The number of the first fixing pins 260 and third through holes 228 and the inserting position of the first fixing pins 260 may be determined variously, considering the weight and exterior design of the body 1.

Meanwhile, a third side wall 224 may be provided in the support member 220 to connect the first side wall 222 and the second side wall 223 with each other. The first and second holding member 240-1 and 240-2 may be partially exposed outside via the third side wall 224 to provide easy accessibility to the user. As one of examples, a plurality of openings 224a may be provided in the first side wall 224 to partially expose the first and second holding members 240.

Meanwhile, the stopper 216 may be provided in the connection member 210 and it may contact with the support member 220 at the maximum tilted angle of the connection member 210 with respect to the support member 220. as one of examples, the stopper 216 may contact with the third side wall 224 at the maximum tilted angle of the connection member 210. The maximum tilted angle may be 180°.

As mentioned above, the structure of the connection member 210 according to the present invention is identical to that of the connection member 110 according to the first embodiment, except that the plurality of the tooth parts 213 may be provided in the connection member 210 according to the second embodiment and that the connected part 217 is provided between the tooth parts 213-1 and 213-2.

The structure of the holding member 240 according to the second embodiment is identical to that of the holding member 240 according to the first embodiment, except that the first and second holding members 240-1 and 240-2 compose the holding member 240.

Moreover, the support member 220 according to the second embodiment is different from the support member 120 according to the first embodiment in the shape of the third side wall 224 to couple the holding members 240-1 and 240-2 and to expose the holding members 240-1 and 240-2 outside partially.

Referring to FIGS. 9 to 12, the process of adjusting the tilted angle of the body 1 in the lighting apparatus 100 having the structure mentioned above will be described in detail.

Figure 10:
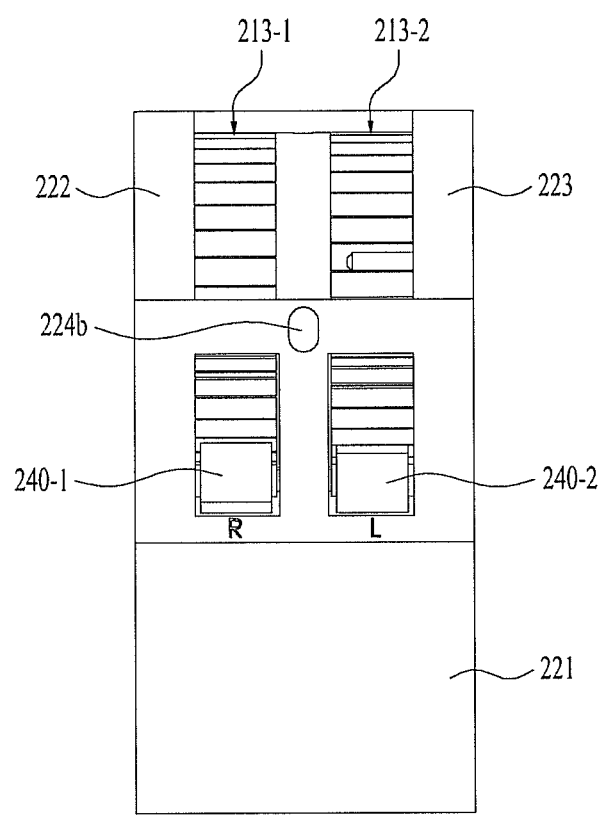
FIG. 10 is a plane view to illustrate a tilted angle adjustment state of the lighting apparatus according to the second embodiment of the present invention.
Figure 11:
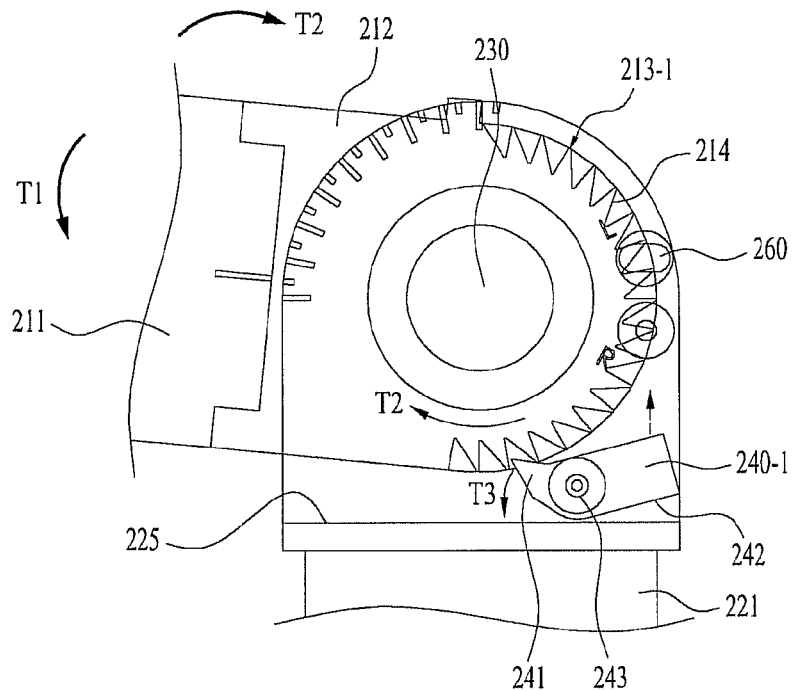
FIGS. 11 and 12 are conceptual diagrams to explain the tilted angle adjustment state of the lighting apparatus according to the second embodiment of the present invention.
Figure 12:
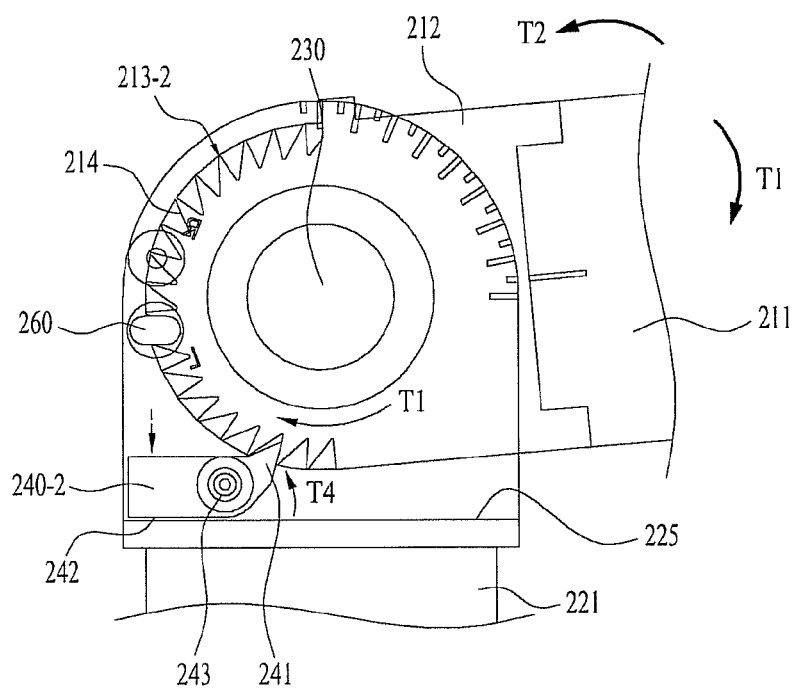

FIG. 10 is a plane view to illustrate a tilted angle adjustment state of the lighting apparatus according to the second embodiment of the present invention. FIGS. 11 and 12 are conceptual diagrams to explain the tilted angle adjustment state of the lighting apparatus according to the second embodiment of the present invention; and As mentioned above, the rotation locking structure between the first tooth part 213-1 and the first holding member 240-1 and the rotation locking structure between the second tooth part 213-2 and the second holding member 240-2 according to the second embodiment is identical to the rotation locking structure between the tooth part 113 and the holding member 140 according to the first embodiment, except that the plurality of the tooth parts 213 and the plurality of the holding members are provided. For explanation sake, only the rotation locking structure of the first tooth part 213-1 and the first holding member 240-1 will be explained.

Referring to FIG. 11, the first tooth part 213-1 may be provided in the connection member 210 and the latch part 241 fixed to the tooth part 213 may be provided in the first holding member 240-1 in the rotation locking state of the connection member 210.

Referring to FIGS. 1 and 11, when the user releases the contact between the first holding member 240-1 and the connection member 210 after applying an external force to the first holding member 240-1, the rotation locking state of the connection member 210 may be unlocked to make the body 1 rotate in the first tilted direction (T1) or the second tilted direction (T2).

Referring to FIG. 11, as one embodiment, the first holding member 240-1 has the structure to rotate in the first tilted direction (T3) and a second tilted direction (T4) with respect to the latch part 241. At this time, when it is rotated in the first tilted direction (T3) with respect to the latch part 241, the first holding member 240-1 may be separated from the first tooth part 213-1 of the connection member 210 and the rotation locking state of the connection member 210 may be released. Accordingly, the user may rotate the body 1 in the first tilted direction (T1) or the second tilted direction (T2) and adjust the tilted angle of the body 1.

Optionally, when the first holding member 240-1 is rotated in the second tilted direction (T4) with respect to the latch part 241, the latch part 241 of the first holding member 240-1 is rotated toward the first tooth part 213-1 of the connection member 210 and positioned between two neighboring ones of the first saw-teeth 213-1. At this time, the rotation locking state of the connection member 210 may be maintained only if the user applies an additional external force to the body 1.

For such the structure, the first holding member 240 is rotated in the second tilted direction (T4). When the latch part 241 is positioned between neighboring ones of the first saw-teeth 213-1 after that, the rotation of the first holding member 240-1 along the second tilted direction has to be restrained.

As one embodiment, a predetermined portion of the first holding member 240-1 contacts with the support member 220 and the rotation locking state of the first holding member 240-1 in the second tilted direction (T4) may be maintained.

When the first holding member 240-1 is rotated in the second tilted direction (T4), a bottom 242 of the first holding member 240-1 may contact with the support member 220 and the rotation locking state of the first holding member 240-1 may be maintained accordingly. Specifically, when the first holding member 240 is rotated in the second tilted direction (T4), the bottom 242 of the first holding member 240-1 may contact with the third member 221 of the support member 220. more specifically, when the first holding member 240-1 is rotated in the second tilted direction (T4), the bottom 242 of the first holding member 240-1 may contact with a bottom 225 of the space (A) (a top surface of the third member).

The user rotates the first holding member 240-1 in the first tilted direction (T3) in the state of the lighting apparatus 200 being installed according to such the structure. After that, the user may release the rotation locking state of the connection member 210 and the tilted angle of the body 1 may be adjusted in the first tilted direction (T1) or the second tilted direction (T2).

Until now, the rotation locking state of the connection member 210 is described based on the embodiment in that the external force is applied to the first holding member 240-1. However, the rotation locking state of the connection member 210 will be described based on an embodiment in that an external force is applied to the body 1 as follows.

As mentioned above, the first holding member 240-1 may be coupled to the support member 220 to be allowed to rotate in the first tilted direction (T3) with respect to the latch part 241 freely and to be restrained to rotate in the second tilted direction (T4).

Referring to FIG. 11, when the external force is applied to the body 1 in the second tilted direction (T4) as mentioned above, the rotation locking state of the first holding member 240-1 and the rotation locking state of the connection member may be released.

In other words, when the body 1 has the external force applied in the second tilted direction (T2), the first holding member 240-1 may be provided with a rotational force in the first tilted direction (T3). At this time, the first holding member 240 is allowed to rotate with respect to the latch part 241 in the first tilted direction (T3) freely. Accordingly, even without applying the external force to the first holding member 240, the user may apply the external force to the body 1 along the second tilted direction (T2) and adjust the tilted angle of the body 1.

Optionally, when an external force is applied to the body 1 in the first tilted direction (T1), the rotation locking state of the first holding member 240-1 may be maintained by the support member 220. Also, the predetermined portion of the first holding member 240-1 is in contact with the support member 220 and the rotation locking state of the first holding member 240-1 may be maintained accordingly.

Briefly, the user may apply the external force to the first holding member 240-1 to release the rotation locking state of the connection member 210 with respect to the support member 220 and to adjust the tilted angle of the body 1 in the first tilted direction (T1). The user may apply the external force to the body 1 or the first holding member 240-1 to adjust the tilted angle of the body 1 in the second tilted direction (T2).

As mentioned above, the first tooth part 213-1 consists of a plurality of saw-teeth 214 and a unit adjustment angle may be determined based on a distance between neighboring teeth, namely, a pitch (for example, a circular pitch) to adjust the tilted angle of the body 1. The second tooth part 213-2 also consists of a plurality of saw-teeth 214 and a unit adjustment angle may be determined based on a distance between neighboring teeth, namely, a pitch (for example, a circular pitch) to adjust the tilted angle of the body 1.

In this instance, the unit adjustment angles for adjusting the tilted angle of the body 1 may be determined based on the twisted angles of the first tooth part 213-1 and the tooth part 213-2 or they may be determined based on a smaller circular pitch than the circular pitches of the first and second tooth parts 213-1 and 213-2.

Moreover, the first tooth part 213-1 and the second tooth part 213-2 are twisted a predetermined angle. Accordingly, when the connection member 210 is maintained in the rotation locking state with respect to the support member 220, the first tooth part 213-1 may be fixed to the first holding member 240-1 and the second tooth part 213-2 is fixed to the second holding part 240-2. In other words, because of the twisted angle of each first tooth part and the second tooth part 240-2, the rotation locking state of the connection member 210 may be maintained by the first holding member 240-1 or the second holding member 240-2.

FIG. 10 is a diagram illustrating that the rotation locking state of the first holding member 240-1 is maintained by the support member 220 and that the rotation locking state of the connection member 210 is maintained by the connection member 210. FIG. 11 is a diagram of the first holding member 240-1 and FIG. 12 is a diagram of the second holding member 240-2.

Referring to FIGS. 10 to 12, when an external force is applied to the body 1 in the first tilted direction (T1), the rotation locking state of the connection member 210 may be maintained by the first holding member 240-1 or the second holding member 240-2.

Also, the predetermined portion of the first holding member 240-1 or the second holding member 240-2 is in contact with the support member 220 and the rotation locking state of the first or second holding member 240-1 or 240-2 may be maintained accordingly.

Meanwhile, when the contact state of the first or second holding member 240-1 or 240-2 with the support member 240 is released by applying the external force to the first or second holding member 240-1 or 240-2 in the rotation locking state, the rotation locking state of the connection member 210 is released to allow the body 1 to be rotatable in the first tilted direction (T1) or the second tilted direction (T2). That is identical to the relation between the holding member 140 and the tooth part 113 described in the first embodiment.

When an external force is applied to the body 1 in the second tilted direction (T2), the rotation locking state of the first or second holding member 240-1 or 240-2 and the rotation locking state of the connection member 210 may be released. For example, when the user applies an external force to the second holding member 240-2 in the lighting apparatus 200 of FIG. 10, the second holding member 240-2 may be separated from the second tooth part 213-2 of the connection member 210 and the rotation locking state of the connection member 210 may be released. After that, the user is able to adjust the tilted angle of the body 1 along the first tilted direction (T1) or the second tilted direction (T2).

Similarly, the user applies an external force to the body 1 in the second tilted direction (T2) in the lighting apparatus 200 of FIG. 10. Accordingly, the user can adjust the tilted angle of the body 1.

Figure 13:
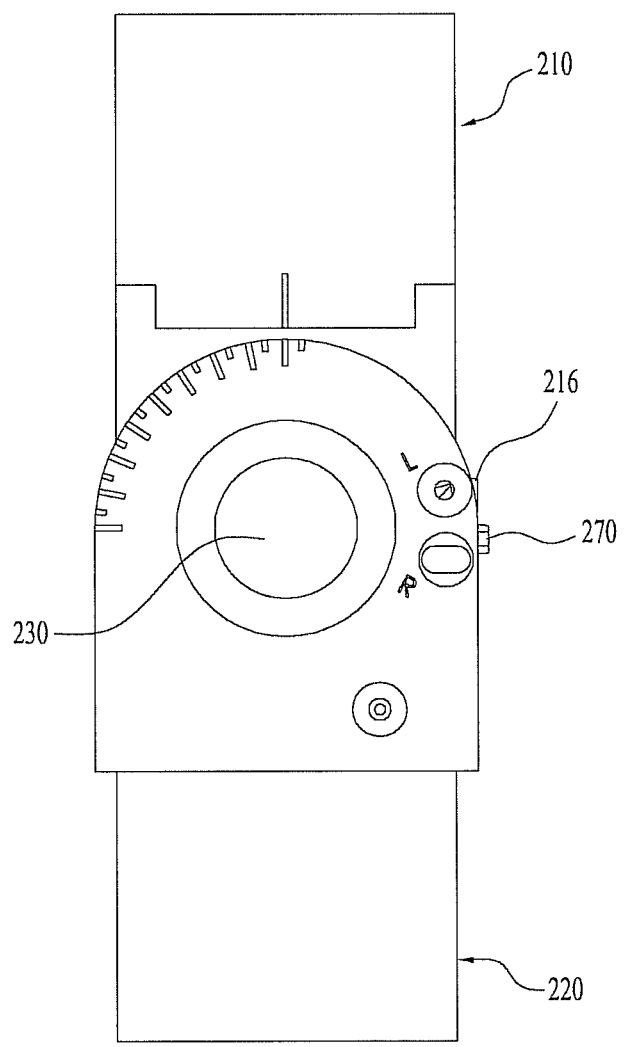
FIG. 13 is a side view to explain the tilted angle adjustment state of the lighting apparatus according to the second embodiment of the present invention.

FIG. 13 is a side view to explain the tilted angle adjustment state of the lighting apparatus according to the second embodiment.

As mentioned above, the stopper 216 may be provided in the connection member 210, to contact with the support member 220 at the maximum tilted angle of the connection member 210 with respect to the support member 220. As one embodiment, the stopper 216 may contact with the first side wall 224 at the maximum tilted angle of the connection member 210. The maximum tilted angle may be 180°.

As mentioned above, the connected part 217 may be provided between the first tooth part 213-1 and the second tooth part 213-2. The stopper 216 may be provided at a longitudinal end of the connected part 217.

The lighting apparatus may further include a second fixing pin 270 inserted in the connected part 217 via the support member 220 at the maximum tilted angle. As mentioned above, the support member 220 and the connection member 210 may substantially form a straight line. At this time, the second fixing pin may be inserted in the support member 220 and the connection member 210 to maintain the tilted angle of the connection member 210.

As one embodiment, an insertion hole 218 may be formed in the connected part 217 and a through hole 224b may be provided in the third side wall 224 of the support member 220. The second fixing pin 270 may be inserted in the insertion hole 218 after passing the through hole 224b. At this time, the stopper 216 of the connection member 216 may contact with the third side wall 224 of the support member 220.

So far, it has been explained that the first tooth part 213-1 and the second tooth part 213-2 are twisted a predetermined angle, and the present invention is not limited thereto. The first tooth part 213-1 and the second tooth part 213-2 are provided without twisted. At this time, the rotation locking states of the first tooth part 213-1 and the second sat-tooth part 213-2 may be maintained or released by the first holding member 240-1 and the second holding member 240-2 simultaneously.

As mentioned above, the irradiation angle of the body can be adjusted freely in the lighting apparatus according to the embodiment of the present invention.

Furthermore, according to the lighting apparatus according to the embodiment, the irradiation angle of the body can be adjusted easily in the installation spot or in the installed state. Accordingly, luminance efficiency may be enhanced and the energy may be saved.

Still further, the lighting apparatus according to the embodiment of the present invention may reduce the number of the parts and the production cost and enhance reliability.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A lighting apparatus comprising:
   a body comprising a substrate, an LED mounted on the substrate, an electronic module to supply an electric power to the LED and a heat sink to radiate the heat generated from the LED;
   a connection member having a one portion provided in the body and the other portion having a tooth part provided therein;
   a support member to support the connection member and to have the tooth part positioned therein;
   a first shaft to rotatably connect the support member and the connection member with each other; and
   a holding member provided in the support member to maintain or release a rotation locking state of the connection member with respect to the support member based on a rotational direction of the tooth part, the holding member comprising a latch part selectively fixed to and separated from the tooth part,
   wherein the latch part allows the tooth part to rotate in one direction of the tooth part and not to rotate in the other opposite direction of the tooth part.

2. The lighting apparatus according to claim 1, wherein the latch part maintains a rotation locking state of the tooth part in a first tilted direction in which the weight of the body works, and
   the latch part allows the rotation of the tooth part in a second tilted direction which is the reverse direction of the first tilted direction.

3. The lighting apparatus according to claim 2, wherein when the latch part of the holding member is separated from the tooth part of the connection member by applying an external force to the latch part, a rotation locking state of the connection member is released.

4. The lighting apparatus according to claim 2, wherein a rotation locking state of the holding member is maintained by the support member, when an external force is applied to the body in a first tilted direction.

5. The lighting apparatus according to claim 4, wherein the rotation locking state of the holding member is maintained by making a predetermined portion of the holding member contact with the support member.

6. The lighting apparatus according to claim 5, wherein when the contact between the holding member and the support member is released by applying an external force to the holding member, the rotation locking state of the connection member is released to make the body be rotatable in a first tilted direction or a second tilted direction.

7. The lighting apparatus according to claim 5, wherein when an external force is applied to the body, the rotation locking state of the holding member and the rotation locking state of the connection member are released.

8. The lighting apparatus according to claim 1, further comprising:
a first fixing pin fixed to the tooth part via the support member.

9. The lighting apparatus according to claim 8, wherein the first fixing pin is inserted in a predetermine space formed between neighboring saw-teeth of the tooth part.

10. The lighting apparatus according to claim 1, wherein an angle display part is provided in the support member to display a tilted angle of the connection member with respect to the support member.

11. The lighting apparatus according to claim 1, wherein one or more stopper is provided in the connection member to contact with the support member at the maximum tilted angle of the body.

12. The lighting apparatus according to claim 1, wherein the tooth part comprises a first tooth part and a second tooth part twisted a predetermined angle with respect to the first tooth part, and
the holding member comprises a first holding member selectively fixed to the first tooth part and a second holding member selectively fixed to the second tooth part.

13. The lighting apparatus according to claim 12, wherein the first tooth part and the second tooth part have the same circular pitch.

14. The lighting apparatus according to claim 12, wherein a unit adjustment angle to adjust the tilted angle of the body is determined based on the twisted angles of the first and second tooth parts.

15. The lighting apparatus according to claim 13, wherein the unit adjustment angle to adjust the tilted angle of the body is determined based on a circular pitch smaller than the circular pitches of the first and second tooth parts.

16. The lighting apparatus according to claim 12, wherein when an external force is applied to the body, the rotation locking state of the connection member is maintained by the first holding member or the second holding member.

17. The lighting apparatus according to claim 16, wherein the rotation locking state of the first holding member or the second holding member is maintained by making a predetermined portion of the first holding member or the second holding member contact with the support member.

18. The lighting apparatus according to claim 17, wherein when the contact state between the corresponding holding member and the support member by applying the external force to the first or second holding member in the rotation locking state, the rotation locking state of the connection member is released to make the body be rotatable in a first tilted direction or a second tilted direction.

19. The lighting apparatus according to claim 18, wherein when the external force is applied to the body in the second tilted direction, the rotation locking state of the first holding member or the second holding member and the rotation locking state of the connection member are released.

20. The lighting apparatus according to claim 12, wherein the support member comprises a side wall and a second side wall that are spaced apart a predetermined distance from each other, and
the tooth part of the connection member is arranged in a space part formed between the first side wall and the second side wall, and
a first shaft passes one of the side walls and the connection member to rotatably couple the connection member to the support member.

21. The lighting apparatus according to claim 20, wherein the first holding member and the second holding member are arranged in the space part between the first side wall and the second side wall, and
the first holding member and the second holding member are coupled to a second shaft passing through one of the side walls.

22. The lighting apparatus according to claim 20, wherein an angle display part is provided in one of the side walls to display a tilted angle of the connection member with respect to the support member.

23. The lighting apparatus according to claim 12, further comprising:
a first fixing pin fixed to the first tooth part or the second tooth part via the support member.

24. The lighting apparatus according to claim 23, wherein the first fixing pin is inserted in a space between neighboring saw-teeth of the corresponding tooth part.

25. The lighting apparatus according to claim 12, wherein the tooth part comprises a connected part provided between the first tooth part and the second tooth part, and
a stopper is provided in a longitudinal end of the connected part to contact with the support member at the maximum tilted angle of the connection member with respect to the support member.

26. The lighting apparatus according to claim 25, further comprising:
a second fixing pin inserted in the connected part via the support member at the maximum tilted angle of the connection member.

27. The lighting apparatus according to claim 25, wherein a slot is provided in the connected part, and
a cable connected to the electronic module is exposed outside via the slot of the connected part and the support member.

28. A lighting apparatus comprising:
a body comprising a substrate, an LED mounted on the substrate, an electronic module to supply an electric power to the LED and a heat sink to radiate the heat generated from the LED;
a connection member provided in the body;
a support member having the connection member rotatably coupled thereto; and
a holding member provided in the support member to maintain a rotation locking state of the connection member to maintain the body tilted at a predetermined angle with respect to the support member,
wherein the rotation locking state of the connection member is released to adjust the tilted angle of the body, when an external force is applied to the body or the holding member in a first tilted direction in which the weight of the body acts or a second tilted direction which is the reverse direction of the first tilted direction.

* * * * *